July 24, 1956     H. B. RICHARD     2,756,386
ARMATURE CHECKING METHOD
Filed Sept. 25, 1952
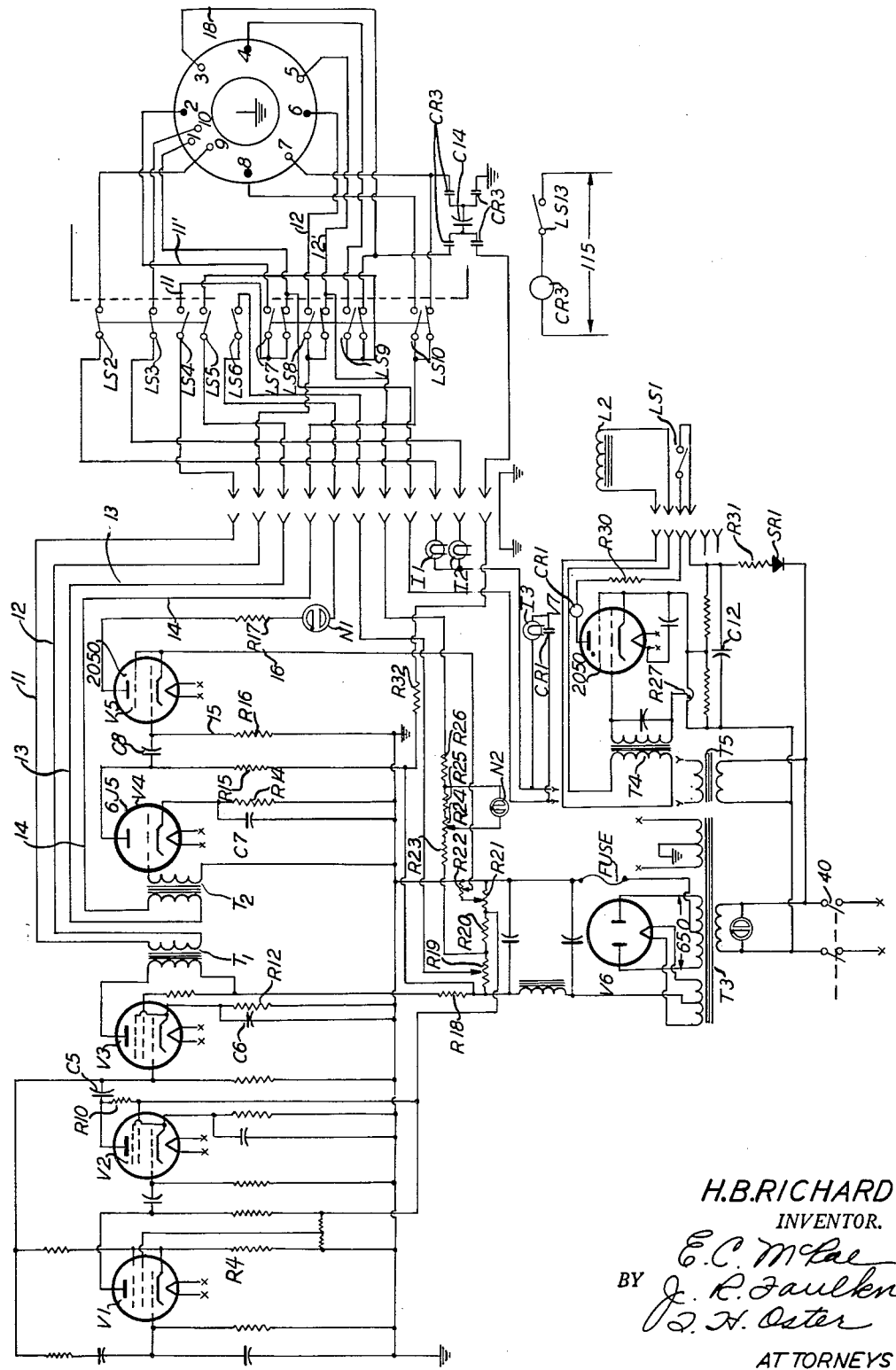
H. B. RICHARD
INVENTOR.
BY E. C. McRae
J. R. Faulkner
J. H. Oster
ATTORNEYS

United States Patent Office 2,756,386
Patented July 24, 1956

2,756,386

ARAMATURE CHECKING METHOD

Howard B. Richard, Plymouth, Mich., assignor to Ford Motor Company, Dearborn, Mich., a corporation of Delaware Application September 25, 1952, Serial No. 311,468

5 Claims. (Cl. 324—51)

This invention deals with the science of electrical testing and directly with a process and apparatus for routinely and quickly checking, and in some cases repairing direct current armatures.

Basically, this tester is dependent upon a Wheatstone bridge circuit and is especially applicable to armatures in which the commutator contains a number of bars which is a whole multiple of four.

This invention can best be understood by reference to the single drawing. The upper right hand corner of this drawing illustrates diagrammatically a fixture designed to receive the commutator of a completed direct current armature and to contact the bars of this commutator as shown at points 1 through 10. Points 2 and 6, 4 and 8, 1 and 5 and 3 and 7 are directly opposite each other across the diameter of the commutator. The odd numbered contacts are spaced as close to the center of an arc connecting the even numbered contacts as the geometry of the commutator will permit and still keep the contact on only one bar. The fixture illustrated is designed for a 28 bar machine and hence for a commutator having seven bars in a quadrant. For this reason contact 3 is closer to contact 4 that it is to contact 2. The purpose of contact points 9 and 10 will become apparent as the description proceeds.

Energy is received through switch 40 from a convenient commercial source such as the usual 115 volt, 60 cycle light circuit. This energy is led into the primary of transformer T3 which supplies the high voltage alternating current which is later rectified for a source of B current and also the 6 3/10 volt and 5 volt filament sources.

The high voltage alternating current output from the secondary of transformer T3 is led into full wave rectifying tube V6 which may conveniently be a 5Y3. The rectified B plus current produced by rectifying tube V6 and the associated filter circuit is employed to energize an audio frequency oscillator. The values of the component parts of this oscillator are chosen so that a frequency of about 760 cycles per second is obtained. This oscillator comprises vacuum tube V1 and vacuum tube V2 which are conveniently, respectively a 6SJ7 and a 6V6. This oscillator circuit is conventional and forms no part of the invention and hence the circuit will not be described in further detail. The output voltage from oscillator vacuum tube V2 appearing as a voltage drop across resistance R10 is transferred to the grid of power amplifying vacuum tube V3 (6L6) through capacitor C5. The plate current of vacuum tube V3 is supplied from the output of rectifier tube V6 through resistance R18 and flows through the tube to ground through capacitor C6 and resistance R12. The primary of transformer T1 forms a portion of this plate circuit and serves to withdraw the needed energy from the amplifying circuit.

As an integral part of this machine are micro-switches LS2, LS3, LS4, LS5, LS6, LS7, LS8, LS9, and LS10. It will be noted that micro-switches LS7, LS8, LS9 and LS10 are double throw switches in which one circuit is open while the other is closed. It is further to be noted that micro-switches LS2, LS3, LS4 and LS5 are ganged together as are micro-switches LS7, LS8, LS9 and LS10. Micro-switch LS6 operates independently of the two ganged sets of switches. When micro-switch LS2 is closed, micro-switch LS3 is likewise closed, while micro-switches LS4 and LS5 are open. When micro-switch LS7 is opened as to the upper circuit, all of micro-switches LS8, LS9 and LS10 are likewise opened. Similarly, when the upper circuit of micro-switch LS7 is opened, the lower circuit is closed, as are the lower circuits of micro-switches LS8, LS9 and LS10.

The output from the secondary of transformer T1 is fed through lead 11 and 11' through micro-switches LS4 and LS7 to contact 2 and contact 1 for a purpose which will become apparent as the description proceeds. The other leg of secondary of transformer T1 is connected to lead 12 and 12' through micro-switch LS8 to contact 5 and contact 6. The primary of transformer T2 is connected through lead 13, micro-switch LS5, micro-switch LS9 to contact 4. The other leg of the primary of transformer T2 is connected through lead 14, micro-switch LS10 to contact 8.

This armature checking device is dependent upon the fact that the number of commutator segments is a whole multiple of four. When an armature is inserted in the armature tester so that contacts 2 and 6 are upon diametrically opposite bars, contacts 4 and 8 will also be upon diametrically opposite bars spaced ninety degrees from contacts 2 and 6. The alternating potential applied across contacts 2 and 6 will result in no potential appearing between contacts 4 and 8 if the armature is electrically balanced. Any potential which may be engendered across contacts 4 and 8 due to an electrical unbalance in the armature is reflected through the primary of transformer T2 into its secondary which is in turn connected across ground and the grid of amplifier vacuum tube V4 which is a 6J5 triode. Amplifier V4 obtains its plate current from the same B power source and is grounded through capacitor C7 and resistance R14. The output of vacuum tube amplifier V4 appears across resistance R15 in its plate circuit and is transferred by capacitor C8 to the grid of thyratron V5 which is a 2050. The grid of thyratron tube V5 is grounded through conductor 15 and resistance R16. The cathode of thyratron V5 is biased at a potential above ground through conductor 16 and potentiometer R22. By means of judicious selection of the setting of potentiometer R22, the sensitivity of the apparatus as to unbalance can be adjusted. The reception of an unduly high potential through contacts 4 and 8, transformer T2, and vacuum tube amplifier V4 results in thyratron V5 firing through resistance R17 and neon bulb N1 through micro-switch LS6. When this circuit is properly operating neon bulb N1 will be dark as the armature is electrically balanced, and will glow if this electrical unbalance exceeds the predetermined minimum.

It will be apparent from a study of the drawing that this testing circuit is fundamentally a Wheatstone bridge and that an armature defect, or unbalance located too close to any of contacts 2, 4, 6 or 8 may possibly escape detection. To guard against this contingency, contacts 1, 3, 5 and 7 have been provided and located intermediate contacts 2, 4, 6 and 8 as nearly as the geometry of the commutator will permit. Starting with contact 1, connection is made through lead 11', micro-switch LS7 to lead 11 and hence through micro-switch LS4. Contact 3 is connected to lead 18 and hence through micro-switch LS9 and micro-switch LS5 to lead 13. Similarly, contact 5 is connected to lead 12'. Contact 7 is connected to micro-switch LS10 and to lead 14.

It is necessary for an understanding of the operation of checking for balance to consider the operation of micro-switches LS6 through LS10. When an armature is inserted into the circuit these switches are in the position shown in the drawing. It will be observed that micro-switch LS6 is opened to break the plate circuit of thyratron V5. After an armature has been inserted to make proper contact with contacts 1 through 10, to start the testing operation micro-switch LS6 is momentarily closed and the armature is tested for unbalance through the odd numbered contact points 1, 3, 5 and 7. Micro-switch LS6 is now opened and ganged micro-switches LS7, LS8, LS9 and LS10 are moved to the other position and micro-switch LS6 momentarily closed. This then checks the armature for unbalance through even numbered contacts 2, 4, 6 and 8. It is necessary to have micro-switch LS6 opened during the switching to ganged micro-switches LS7, LS8, LS9 and LS10 to avoid the reception of spurious signals due to the switching operation. This phase of the test will detect opens, shorts and some types of misconnections.

It is desirable before starting an armature test to be certain that the armature is properly mounted in the machine and that the proper contacts have been made. A circuit has been provided for making this check and obtains its energy from the secondary of transformer T5 which is energized along with transformer T3. One leg of the transformer T5 is connected directly to contact 1, the other side of the secondary of transformer T5 is connected through incandescent bulbs I1 and I2, micro-switches LS2 and LS3 to contacts 9 and 10. At the beginning of the test micro-switches LS2 and LS3 are closed as shown in the drawing and incandescent bulbs I1 and I2 will light if the proper contacts have been made. To avoid mutual interference between the Wheatstone bridge circuit and the testing circuit originating at transformer T5, micro-switches LS4 and LS5 are provided and are open as shown in the drawing. Before proceeding with the Wheatstone bridge test ganged micro-switches LS2, LS3, LS4 and LS5 are thrown to open the testing circuit having its origin in transformer T5 and to close the testing circuit dependent upon the Wheatstone bridge.

To check the armature for grounds a connection is made between contact 5 along lead 12' around micro-switch LS8 and into resistors R26, R25 and R23 which are arranged in series. The input side of resistor R23 is energized from a voltage divider comprising resistances R19, R20, and R21. Potentiometer R24 is located between resistance 23 and resistance 25 and indicating neon bulb N2 is connected between a point located between resistors R25 and R26 and the movable contact of potentiometer R24. Since the shaft of the armature is grounded the existence of any current between the windings of the commutator and the core or shaft will result in neon bulb N2 lighting.

It sometimes occurs in connecting the armature coil leads to the commutator that an incorrect angular relationship is established between the points at which the coil leads emerge from the core and the bar at which the coil is connected. This type of an armature defect will not show up as an unbalanced condition, but is nevertheless detrimental to the machine. To check for this type of defect, a magnetic pick up coil L2 is provided directly adjacent contact pin 6 where it is exposed to the maximum field generated by the output of vacuum tube V3 flowing through the armature windings. The output of magnetic pick up L2 is fed into the primary of transformer T4. The secondary of transformer T4 is connected on one hand to the grid of thyratron V7 which is a 2050 tube and on the other hand to the cathode of thyratron V7 through adjustable biasing potentiometer R27. Thyratron V7 obtains its B potential from the commercial lighting source and is rectified and filtered by the combination of capacitor C12, selenium rectifier SR1 and resistance R31. This B potential arrives at the thyratron V7 plate through micro-switch LS1, resistance R30 and control relay CR1. Micro-switch LS1 is closed at the time a test is made through the even numbered contact pins and opened when the test is being made through the odd numbered contact pins. The reception of a proper signal will overcome the bias provided by potentiometer R27 and permit thyratron V7 to fire across control relay CR1 and lighting incandescent bulb I3 which is energized from the secondary of transformer T5. In the event the angular shift mentioned above has occurred, the intensity of the magnetic field acting upon magnetic pick up L2 will be insufficient to fire thyratron V7 and the incandescent bulb I3 will remain dark.

In the production of direct current armatures temporary shorts are often established between adjacent commutator bars due to the inadvertent application of solder or the lodging of metal chips between adjacent commutator bars. Provision has been made in this apparatus for the curing of this defect. Basically this operation depends upon the discharge of a heavily charged condenser across the armature through diametrically opposite commutator bars. In the drawing this capacitor is indicated as C14. This capacitor has a value of 48 microfarads and is charged by connecting directly across the B power through resistance R32. Capacitor C14 is controlled by relay CR3. When relay CR3 is in the position shown the condenser will be charged. As the armature to be tested is thrust into the testing apparatus micro-switch LS13 is momentarily closed shortly after contacts 3 and 7 touch the commutator bars. The closing of micro-switch LS13 actuates the armature of control relay CR3 and opens the two bottom contacts and closes the two upper contacts. This results in a discharge of capacitor 14 through the armature coils through contacts 3 and 7. The heavy current so generated will actually remove temporary short circuits by melting or vaporizing the offending metal.

I claim as my invention:

1. In a device for testing armatures carrying a commutator having a number of bars which is a whole multiple of four, a first set of contacts adapted to bear on the commutator and spaced about one hundred and eighty degrees from each other, an oscillator, a second set of contacts also spaced about one hundred and eighty degrees from each other and located midway between said first set of contacts, means connecting said oscillator and contacts for applying the alternating output of the oscillator to said first set of contacts and means for indicating the potential across the second set of contacts.

2. In a device for testing armatures carrying a commutator having a number of bars which is a whole multiple of four, a first set of contacts adapted to bear on the commutator and spaced about one hundred and eighty degrees from each other, an oscillator, a second set of contacts also spaced about one hundred and eighty degrees from each other and located midway between said first set of contacts, a third set of contacts displaced about forty-five degrees from the first set of contacts and spaced about one hundred and eighty degrees from each other, a fourth set of contacts spaced about one hundred and eighty degrees from each other and located midway between the third contacts, means connecting set oscillator and contacts for applying the alternating output of the oscillator alternately to the first and third sets of contacts and means for alternately indicating the potential across the second and fourth sets of contacts.

3. In a process for testing armatures carrying a commutator having a number of bars which is a whole multiple of four, the steps of applying an alternating potential to the armature through commutator bars spaced about one hundred and eighty degrees from each other, measuring the potential existing between the two commutator bars located midway between the energized bars, transferring the alternating potential to a pair of commutator bars spaced about one hundred and eighty degrees from each other and located approximately midway between the first energized bars and the bars across which the potential was measured, and measuring the potential existing between the two commutator bars located midway between the last energized bars.

4. In a process for testing armatures carrying a commutator having a number of bars which is a whole multiple of four, the steps of applying an alternating potential to the armature through commutator bars spaced about one hundred and eighty degrees from each other, and measuring the potential existing between two commutator bars located midway between the energized bars.

5. In a process for testing armatures carrying a commutator having a number of bars which is a whole multiple of four, the steps of discharging a heavily charged capacitor through the armature, applying an alternating potential to the armature through commutator bars spaced about one hundred and eighty degrees from each other, and measuring the potential existing between the commutator bars located midway between the energized bars.

References Cited in the file of this patent

UNITED STATES PATENTS

| | | |
|---|---|---|
| 363,129 | Easton | May 17, 1887 |
| 1,479,284 | Cullin | Jan. 1, 1924 |
| 2,593,131 | Foust | Apr. 15, 1952 |